United States Patent [19]

Roba

[11] Patent Number: 4,608,070

[45] Date of Patent: Aug. 26, 1986

[54] PROCESS FOR MANUFACTURING OPTICAL-FIBRE PREFORMS AT HIGH DEPOSITION RATE

[75] Inventor: Giacomo Roba, Beinasco-Torino, Italy

[73] Assignee: Cselt Centro Studi e Laboratori Telecomunicazioni S.p.A., Turin, Italy

[21] Appl. No.: 650,297

[22] Filed: Sep. 12, 1984

[30] Foreign Application Priority Data

Sep. 15, 1983 [IT] Italy .................. 67954 A/83

[51] Int. Cl.[4] .............. C03B 37/018; C03B 37/027
[52] U.S. Cl. .................................. 65/3.12; 65/2
[58] Field of Search .................. 65/3.12, 3.2, 2

[56] References Cited

U.S. PATENT DOCUMENTS

| 4,263,032 | 4/1981 | Sinclair | 65/3.12 |
|---|---|---|---|
| 4,334,903 | 6/1982 | MacChesney | 65/3.12 |
| 4,417,911 | 11/1983 | Cundy | 65/3.12 |

Primary Examiner—Kenneth M. Schor
Attorney, Agent, or Firm—Karl F. Ross; Herbert Dubno

[57] ABSTRACT

The process allows a uniform layer of glass particles, forming the preform, to be deposited on the internal wall of a supporting tube rotated around its axis. A suitable relationship is provided to determine the temperature distribution in the deposition zone. The apparatus makes use of different types of heat sources for generating inside the tube a temperature with the distribution required by the process.

2 Claims, 2 Drawing Figures

PROCESS FOR MANUFACTURING OPTICAL-FIBRE PREFORMS AT HIGH DEPOSITION RATE

Field of the Invention

My present invention relates to physical carriers for optical telecommunications systems and, more particularly to a process for manufacturing optical fiber preforms at high deposition rate.

BACKGROUND OF THE INVENTION

The process for optical fiber production comprises two main stages: one in which a cylindrical preform is made having a radial refractive index profile similar to that of the fibers to be drawn and the other in which the preform is heated and drawn into the fibers.

The first stage requires much care if fibers having good mechanical and light transmissive, properties are to be obtained. More particularly it is necessary to reduce to a minimum metallic and/or water contamination of the preform in order to avoid the high losses due to absorption in the wavelength range used in telecommunications.

To this end, several methods have been developed which, besides ensuring high material purity, allow a reasonable formation rate of the preform.

A widely known method is based on the planar deposition of oxides obtained by chemical synthesis from vapor-phase reactants.

This method named CVD (Chemical Vapor Deposition) has a least two variants: IVPO and OVPO.

The first variant involves deposition on the inner surface of a supporting tube (Inside Vapor Phase Oxidation), while the second variant involves deposition on the outer surface of a supporting mandrel (Outside Vapor Phase Oxidation). In both cases chemical reactants are transmitted towards the support and oxidized by a burner flame in an atmosphere enriched with oxygen to provide powdered silicon dioxide (silica), suitably doped with oxides of other elements according to the refractive index required.

In the case of the IVPO process, the reactants flow into the supporting tube, which is made of silica glass, and the oxidation reactions, with subsequent deposition, are obtained by translation in the direction of the reactant flow of a high-temperature annular zone.

After a suitable number of deposition cycles the preform has a tubular shape and a spongy structure of milky colour or is already vitrified, depending on the temperature at which the previous operations have been carried out. At this point, the preform is collapsed, by application of high temperature, into a solid transparent rod.

These kinds of processes generally present greater flexibility, chiefly in the dopant choice and in the formation of the refractive-index profile, by comparison with outside vapor-phase deposition processes of the OVPO type. In particular, the MCVD process (Modified Chemical Vapor Deposition) derived from IVPO techniques is the most widely used in optical fiber manufacture.

Yet, the inside-vapor deposition processes do not permit high deposition rates and hence high fiber fabrication rates.

In fact they use deposition techniques of the "nonlocal" type, wherein the reaction zone does not coincide with the deposition zone. In the reaction zone glass compounds are synthesized in the form of small particles in a colloidal suspension, while in the deposition zone the glass particles adhere to the quartz substrate as an effect of thermophoretic phenomena.

The deposition quality in terms of uniform dopant concentration, of axial uniformity of deposited mass and of absence of localized imperfections (reactant incorporation into the matrix, diffusion centres, etc.) is strictly dependent upon the flow of the gases carrying the glass particles. Such flow should provide laminar conditions and hence must be limited to a finite range of values which depend on the reactor type.

Furthermore, to avoid the formation of local imperfections in the inside techniques, the deposited material should be vitrified and solidified immediately after the deposition. That implies the use of working temperatures in the deposition zone higher than the temperature of vitreous transition of the deposited matrix. It is clear that if the axial thermal gradient is taken into account a layer of too thick a material cannot be deposited; in fact the external temperature would be locally too high and hence the quartz reactor might be permanently damaged.

The inferior productivity is also due to the fact that at the end of the deposition stage the preform is intended to undergo a collapsing operation on the same apparatus to be used for subsequent cycles.

The external deposition techniques are local deposition techniques. They produce a porous non-solidified structure, consisting of particles at a temperature inferior to that of the vitreous transition of the matrix. The porous structure does not undergo thermal stresses, as it is not yet solidified, thus deposition can be effected intensely and with large dimensions.

After the deposition, the external techniques require a subsequent step for dehydrating and solidifying the structure.

Yet this phase does not entail any shrinking like that due to the collapsing in the case of internal technique, as it can take place in parallel; i.e. it is possible to handle a plurality of performs with the same furnace.

More particularly, it can be noted that typically the MCVD process allows a deposition rate of about 2 g/min, corresponding to a fabrication speed of about 5 km/h. By contrast, the typical processes of external deposition (OVD-outside vapor deposition; VAD-vapor axial deposition), allow a deposition rate of about 4.5 g/min corresponding to a fabrication speed of about 10 kg/h.

Hence the productivity of outside-deposition processes is twice as high as that of inside-deposition processes.

Productivity of inside-deposition processes cannot be easily increased on an industrial scale.

In fact interventions designed to increase deposition rate make the process more critical and hinder reproducibility. E.g. deposition rate may be increased by intervening on the thermal gradient by cooling the supporting tube and/or by initiating the reaction by radio-frequency plasma excitation.

Yet, a massive material deposition is obtained only by a considerable increase in the reactant flow. To keep the flow laminar, it is then necessary to modify the reactor dimensions, by increasing its diameter. Under these conditions also the preform collapsing time is increased in contrast with the initial aims.

In inside processes, in fact, productivity depends on the deposition stage as well as on the collapsing stage. These operations, in fact, are carried out at different times by using the same apparatus.

OBJECT OF THE INVENTION

It is an object of the present invention to provide a process which allows a high speed in manufacturing preforms for high-purity optical fibers, more particularly of the kind to be used for long-distance telecommunications, using inside-deposition techniques.

SUMMARY OF THE INVENTION

The present invention provides a process for manufacturing preforms for optical fibres, wherein:
 glass particles are produced to make the preform by a reaction of vapour-phase reactants;
 the particles produced are deposited on the internal surface of a supporting tube rotated around its axis;
 the reaction between the reactants is started at the input of the tube in a region of constant temperature Ti;
 glass particles are contemporaneously deposited along the whole tube by heating the whole tube to a temperature T(r,x) given by the relationship;

$$T(r,x) = T_i \exp\left(-\frac{r^2 v_x}{2L\nu K} \cdot \frac{\frac{x}{L}}{1-\frac{x}{L}}\right)$$

where
 $T(r,x)$ is the temperature as a function or r and x at a distance r from the axis, where r is the internal tube radius, and at a distance x from the input end;
 $T_i$ is the temperature at the input end of the tube;
 $v_x$ is the axial component of the speed of the glass particles;
 L represents the distance from the input end of the tube at which all the particles have been deposited ($x \leq L$);
 $\gamma$ is the kinematic viscosity of vapor flow in the tube;
 K is a proportionality coefficient; so as to obtain a layer of deposited particles with constant thickness.

BRIEF DESCRIPTION OF THE DRAWING

The foregoing and other characteristics of the present invention will be made clearer by the following description of two preferred embodiments thereof, given by way of example and not in a limiting sense, and from the annexed drawing in which.

SPECIFIC DESCRIPTION

Figure 1:
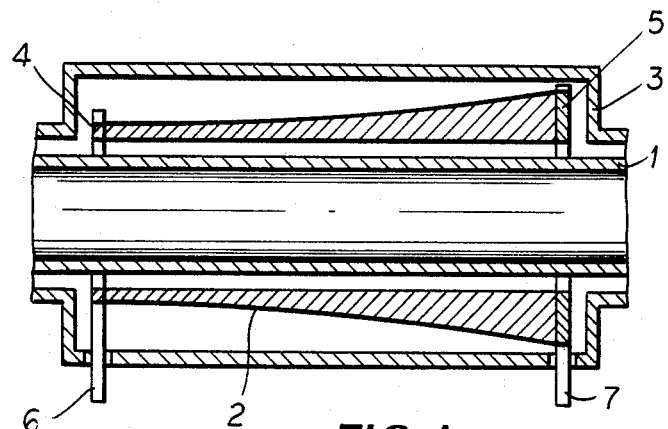
FIG. 1 is a transverse sectional view of a first type of apparatus.

FIG. 1 shows a part of the apparatus for manufacturing optical fibers according to the IVPO process. In particular it shows the reaction chamber 1, i.e. the silica tube where the reaction among vapor state reactants, the production of glass particles and their deposition on the internal wall take place. As known, the reaction is started by a heat source able to raise the vapor temperature at least to 1400° C. and the uniformity of the deposited layer is ensured by rotating the supporting tube 1 around its axis and according to the prior art, by axially translating the heat source.

According to the present invention the reaction is started at the input of tube 1, on the left, and deposition is effected contemporaneously on the whole internal wall. That is obtained by the use of a heat source 2, in this example an electrical furnace, whichg is as long as the deposition zone. A deposited-material layer of constant thickness is obtained thanks to a particular type of furnace. Said furnace can be made of graphite, of tungsten or of other electrical current conducting materials able to withstand a temperature of 2800° C. and presents an approximately cylindrical shape. In particular it is made thus as to generate different heat quantities along the tube axis, with a law which will be better disclosed afterwards. That is obtained by axially varying the wall thickness so as to vary the electrical resistance and hence the heat quantity produced.

The electrical current flows through conductors 6 and 7 and terminals 4 and 5, connected to the furnace. The furnace is insulated from surrounding environment by a container 3, into which inert gas namely-argon is fed.

Figure 2:
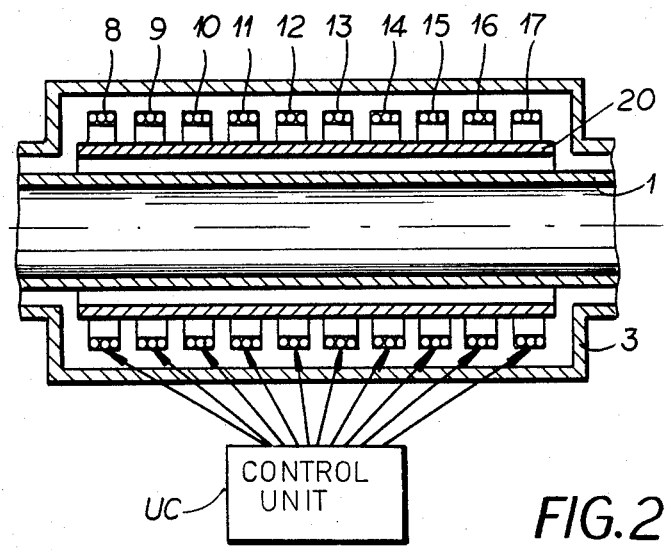
FIG. 2 is a transverse sectional view of a second type of apparatus.

A second apparatus is depicted in FIG. 2, where the same references numerals as in FIG. 1 denoted equivalent structure details.

In this case the desired temperature distribution along the axis of supporting tube 1 is obtained through the indirect heating of a cylindrical furnace muffle 20, made of graphite or tungsten. The heating elements are high-frequency coils 8, 9, ..., 17 controlled by a control unit UC. UC supplies each coil with a suitable high-frequency current so as to obtain in the tube the desired axial temperature distribution. Furance muffle 20 can also be omitted. As to the starting of the reaction between SiCl$_4$ and O$_2$ to obtain SiO$_2$ at the input of the supporting tube, an efficiency of reaction equal to 99% to 1400° C. can be attained if the reaction kinetics develops for 0.1s.

Since means reactant speed $\bar{v}$ ranges from 0.10 to 0.30 m/s, an initial zone, preheated at a constant temperature, is to be provided with a length equal to superior to 0.03 m.

To determine the temperature distribution along the supporting tube axis it is necessary to premise some remarks.

In the IVPO process, the mean flow speed of the reactants ranges from 0.1 to 0.3 m/s and the supporting tube diameter ranges from 15 mm to 30 mm; the Reynolds number Re, defined as $$Re = \frac{\bar{v}l}{\nu}$$

where $\bar{v}$ is the mean flow speed, 1 a characteristic system parameter, and $\gamma$ the fluid kinematic viscosity, assures values less than 500, hence the reactant flow is laminar. As a consequence, since there is no turbulence, the particles produced by the reaction have a radial motion due to causes independent of the main flow.

The particles have a diameter ranging from 0.1 to 1 μm, hence they are small enough to reach the steady state with respect to the reactant flow and to move at the same speed.

Under these conditions it can be affirmed in a first approximation that the mass transfer process, and hence the forces acting on the particles are ruled by diffusion phenomena and in particular by thermal diffusion or thermophoresis.

Since the Schmidt number $\gamma/D \gg 1$, where D is the gas diffusivity, the diffusion component due to concentration gradients is much less than the diffusion component due to temperature gradients.

Once defined that the motion of the glass oxides inside the flow of the carrier gases is ruled by thermophoretic phenomena, parameters and equations on which the motion is based can be found.

In particular it is useful to obtain the relation between the thermophoretic speed of the particles towards the internal wall of the tube and the thermal gradient of the total system composed of the gas and the supporting tube.

A fundamental parameter is the Knudsen number, which is defined as:

$$Kn = \lambda/a$$

where $\lambda$ is the free mean path of the particles and "a" is the particle radius.

In the case of the IVPO process this number takes values less than or equal to unity, that is why computing methods of gas kinetic theory can be applied.

In particular the thermophoretic velocity of the particles is found to be proportional to the thermal gradient and proportionality coefficient K is dependent on the type of carrier gas, on the physical properties of particles and on the values assumed by the Knudsen number.

As a rule thermophoretic velocity $V_t$ is given by the following relation:

$$V_t = -K(\gamma/T)\,\mathrm{grad}\,T \qquad (1)$$

where T is the gas temperature.

By examining at the reactor input an elementary volume obtained by two transversal sections, this contains an elementary quantity of mass particles to be deposited, which moves at the flow velocity v.

A part of this mass begins to deposit thanks to its thermophoretic velocity, and hence to temperature gradient, and goes on as long as the internal wall temperature remains less than that of the gas.

If the temperature of the internal wall of the reactor is always kept lower than gas temperature a particle deposition is obtained along the whole tube. In particular it is necessary to cause the temperature gradient to increase along the tube with a complementary law to that of the moving mass decrease, due to the preceding deposition.

In such a way the glass particles produced only at the tube input progressively increase their radial velocity, hence even the most internal particles can reach at the same time the wall and their radial flow can thus result constant along the tube.

These considerations can be synthetically expressed by the following relations (2) and (3):

$$T(r,x) = T_i \exp\left(-\frac{r^2 v_x}{2LvK} \cdot \frac{\frac{x}{L}}{1 - \frac{x}{L}}\right) \qquad (2)$$

where $T(r,x)$ is the temperature at a distance r from the tube axis, (where r=internal tube radius) and at a distance x from the input end;

$T_i$ is the temperature at the input end of the tube;

$v_x$ is the axial component of glass particle velocity;

L represents the distance from the tube input end at which all the particles have been deposited. Said parameter is chosen while designing the apparatus.

A smaller value of L requires the necessary thermal gradient to be greater;

$\gamma$ and K are the same parameters as previously defined.

This relation allows the temperature distribution $T(r,x)$ to be obtained as function of the distance x, and hence it allows the design of the heat sources of the apparatus of FIGS. 1 and 2.

Besides:

$$\eta = \frac{x_0}{L} = 1 / 1\left(-\frac{\frac{r^2 v_x}{2LvK}}{\ln(T_o/T_i)}\right) \qquad (3)$$

where:

$\eta$ represents the efficiency of the whole process as the inverse ratio between the mass produced by the oxidation reaction and the mass actually deposited as a glass structure on the internal tube wall;

$x_O$ is the length of the supporting tube;

$T_O$ is the temperature at the tube output end.

From relation (3) it is clear that to obtain a high efficiency it is necessary that $r^2 v_{x/2} < < 1$, since the other parameters are constants peculiar of the IVPO techniques, and difficult to modify.

It is clear that what described has been given only by way of non limiting example.

Variations and modifications to the above embodiments may of course be made without departing from the scope of the invention.

By instance, the use of other means for generating along the supporting tube the temperature distribution according to equation (2) is possible. E.g. a plurality of burners can be used to directly or indirectly heat the supporting tube, by properly adjusting the gas flows to obtain the desired temperature distribution.

I claim:

1. A process for producing optical fibers which comprises the steps of:
   forming a preform by:
   producing glass particles by a reaction between vapor-phase reactants,
   rotating a supporting glass tube having an internal surface around its axis,
   initiating said reaction between the reactants in an input end of the tube in a region with constant temperature Ti,
   simultaneously depositing said glass particles along an entire length L of the tube by heating the tube over its entire length L at once to a temperature $T(r,x)$ which is a function of the distance from the input end given by the relationship:

$$T(r,x) = T_i \exp\left( -\frac{r^2 v_x}{2L\nu K} \cdot \frac{\frac{x}{L}}{1 - \frac{x}{L}} \right)$$

where:
exp represents the natural exponent base and the parenthetical expression the power thereof,
$T(r,x)$ is the temperature of the tube at a distance r from the axis, where r is the internal tube radius, and at a distance x from the input end,
$T_i$ is the temperature at the input end of the tube, $v_x$ is the axial component of the speed of the glass particles entrained through said tube by a gas,
L represents the distance from the input end of tube at which all the particles have been deposited,
$\gamma$ is the kinematic viscosity of vapor flow in the tube,
X varies from X=O to X=L, and
K is a proportionality coefficient, so as to obtain a layer of deposited particles with constant thickness;
thermally collapsing said preform; and drawing said fibers from the collapsed tube.

2. The process defined in claim 1 wherein $$\frac{r^2 v_x}{2}$$

is much less than 1.